(12) United States Patent
McClain et al.

(10) Patent No.: US 10,708,387 B2
(45) Date of Patent: Jul. 7, 2020

(54) SERVICE USAGE METERING TECHNIQUES (71) Applicant: Novell, Inc., Provo, UT (US)

(72) Inventors: Carolyn B. McClain, Springville, UT (US); Greg Goodwin, Provo, UT (US); Carl B. Andersen, Orem, UT (US); Bruce L. Bergeson, American Fork, UT (US)

(73) Assignee: Novell, Inc., Provo, UT (US)

( * ) Notice: Subject to any disclaimer, the term of this patent is extended or adjusted under 35 U.S.C. 154(b) by 123 days.

(21) Appl. No.: 14/928,478

(22) Filed: Oct. 30, 2015

(65) Prior Publication Data

US 2017/0126820 A1    May 4, 2017

(51) Int. Cl.
H04L 29/08    (2006.01)

(52) U.S. Cl.
CPC ............ H04L 67/325 (2013.01); H04L 67/34 (2013.01)

(58) Field of Classification Search
CPC ....... H04L 29/08; H04L 67/325; H04L 67/34; H04L 67/16; H04L 67/22
See application file for complete search history.

(56) References Cited

U.S. PATENT DOCUMENTS

| | | | |
|---|---|---|---|
| 7,858,888 B2 | 12/2010 | Lucas et al. | |
| 7,908,358 B1* | 3/2011 | Prasad | G06F 11/3476 709/224 |
| 9,129,052 B2 | 9/2015 | Brookbanks et al. | |
| 9,571,419 B2* | 2/2017 | Beaty | H04L 67/1097 |
| 2009/0135018 A1* | 5/2009 | Veillette | G06F 1/30 340/657 |
| 2009/0135836 A1* | 5/2009 | Veillette | G01D 4/004 370/400 |
| 2010/0250440 A1* | 9/2010 | Wang | G06Q 10/06 705/63 |
| 2013/0120156 A1* | 5/2013 | Swaminathan | G08C 19/00 340/870.02 |
| 2013/0149994 A1 | 6/2013 | Gaddam et al. | |
| 2013/0154850 A1* | 6/2013 | Chan | G08C 19/00 340/870.02 |
| 2013/0185413 A1 | 7/2013 | Beaty et al. | |
| 2014/0032531 A1* | 1/2014 | Ravi | G06F 17/30554 707/722 |
| 2014/0047107 A1* | 2/2014 | Maturana | H04L 43/04 709/224 |
| 2014/0330968 A1* | 11/2014 | Zahoor | G06F 17/30539 709/224 |
| 2015/0244820 A1* | 8/2015 | Verkasalo | G06F 16/958 707/740 |
| 2015/0260562 A1 | 9/2015 | Dawn | |
| 2015/0286394 A1* | 10/2015 | Koval | H04L 67/06 713/156 |

* cited by examiner

Primary Examiner — Benjamin M Thieu
(74) Attorney, Agent, or Firm — Schwegman Lundberg & Woessner, P.A.

(57) ABSTRACT

Metering service instances collect predefined types of metering events on the nodes in which the service instances process. Within each node, the events are statistically filtered, aggregated, and collected. The events are also passed to audit logs. At the conclusion of a metering period or upon detection of a batching event, the aggregated statistically filtered events (statistics) are forward to a collecting cluster where they are populated to a metering statistic data store.

19 Claims, 12 Drawing Sheets

SERVICE USAGE METERING TECHNIQUES

BACKGROUND

Increasingly software is being sold and distributed on a subscription and usage bases as Software-as-a-Service (SaaS). SaaS products require an underlying support mechanism for providing statistical data gathering and aggregation for purposes of providing metrics related to a product's usage.

By and large, existing metering techniques store large amounts of usage metrics, some of which are duplicated in very large commercial databases. These existing techniques also lack the ability to track new and finer-grain metrics and lack the ability to recreate billing activities that extend for periods of time that extend back more than a few months. Additionally, the size and inflexibility of these existing metering techniques typically degrade processing throughput and user responsiveness to the very services that the users are paying for.

In the meantime, Internet Service Providers (ISPs) or service hosting sites are increasingly demanding the ability to provide more accurate, reproducible, and storage/processing efficient mechanisms for usage metrics based on metering. This is so, because the law recently changed permitting ISPs to charge consumers fees commensurate with their actual usage.

So, SaaS providers want the ability to track usage metrics in a more storage and processing efficient manner, and ISPs are demanding it so that they can charge heavy users fees more commensurate with their heavy usage. But, both the SaaS providers and the ISPs currently lack the underlying foundation to provide an acceptable solution.

Therefore, there is a need for improved service metering usage techniques.

SUMMARY

Various embodiments of the invention provide techniques for service usage metering. In an embodiment, a method for distributed service usage metering is presented.

Specifically, a method for service usage metering is provided. A metering period is communicated to distributed network metering services. Next, statistics returned by the distributed network metering service at an end of the metering period are aggregated. Finally, the aggregated statistics are populated into a metering statistic data store.

BRIEF DESCRIPTION OF THE DRAWINGS

FIG. 1H is a diagram of example metering-related configuration tables within a provider database, according to an example embodiment.

FIG. 1I is a diagram of metering-operations tables within a provider database, according to an example embodiment.

DETAILED DESCRIPTION

A "resource" includes a user, service, system, device, directory, data store, groups of users, files, combinations and/or collections of these things, etc. A "principal" is a specific type of resource, such as an automated service or user that at one time or another is an actor on another principal or another type of resource. A designation as to what is a resource and what is a principal can change depending upon the context of any given network transaction. Thus, if one resource attempts to access another resource, the actor of the transaction may be viewed as a principal. Resources can acquire and be associated with unique identities to identify unique resources during network transactions.

An "identity" is something that is formulated from one or more identifiers and secrets that provide a statement of roles and/or permissions that the identity has in relation to resources. An "identifier" is information, which may be private and permits an identity to be formed, and some portions of an identifier may be public information, such as a user identifier, name, etc. Some examples of identifiers include social security number (SSN), user identifier and password pair, account number, retina scan, fingerprint, face scan, Media Access Control (MAC) address, Internet Protocol (IP) address, device serial number, etc.

A "processing environment" defines a set of cooperating computing resources, such as machines (processor and memory-enabled devices), storage, software libraries, software systems, etc. that form a logical computing infrastructure. A "logical computing infrastructure" means that computing resources can be geographically distributed across a network, such as the Internet. So, one computing resource at network site X can be logically combined with another computing resource at network site Y to form a logical processing environment. Moreover, a processing environment can be layered on top of a hardware set of resources (hardware processors, storage, memory, etc.) as a Virtual Machine (VM) or a virtual processing environment.

The phrases "processing environment," "cloud processing environment," and the terms "cloud" and "VM" may be used interchangeably and synonymously herein unless qualified has a "hardware processing environment," "a cloud processing environment," or a "VM."

Moreover, it is noted that a "cloud" refers to a logical and/or physical processing environment as discussed above.

A "service" as used herein is an application or software module that is implemented in a non-transitory computer-readable storage medium or in hardware memory as executable instructions that are executed by one or more hardware processors within one or more different processing environments. A "service" can also be a collection of cooperating sub-services, such collection referred to as a "system."

A single service can execute as multiple different instances of a same service over a network. A service is defined through a service definition. A specific type of service may be referred to as a particular "service process."

A "statistic" is value or set of values obtained in response to a detected event during operation of a service instance for a particular service process, within that service instance's processing environment. Multiple statistics can be combined or aggregated as a single aggregated statistic. Moreover, multiple statistics can be reduced to a reduction statistic. The value or values to obtain based on the detected event can be custom-defined. As used herein a "statistic" may be used synonymously with a "metric" and/or with "metering information."

Various embodiments of this invention can be implemented as enhancements within existing network architectures and network-enabled devices.

Also, any software presented herein is implemented in (and reside within) hardware machines, such as hardware processor(s) or hardware processor-enabled devices (having hardware processors). These machines are configured and programmed to specifically perform the processing of the methods and system presented herein. Moreover, the methods and system are implemented and reside within a non-transitory computer-readable storage media or memory as executable instructions that are processed on the machines (processors) configured to perform the methods.

Of course, the embodiments of the invention can be implemented in a variety of architectural platforms, devices, operating and server systems, and/or applications. Any particular architectural layout or implementation presented herein is provided for purposes of illustration and comprehension of particular embodiments only and is not intended to limit other embodiments of the invention presented herein and below.

It is within this context that embodiments of the invention are now discussed within the context of the FIGS. 1A-1I and 2-4.

Figure 1A:
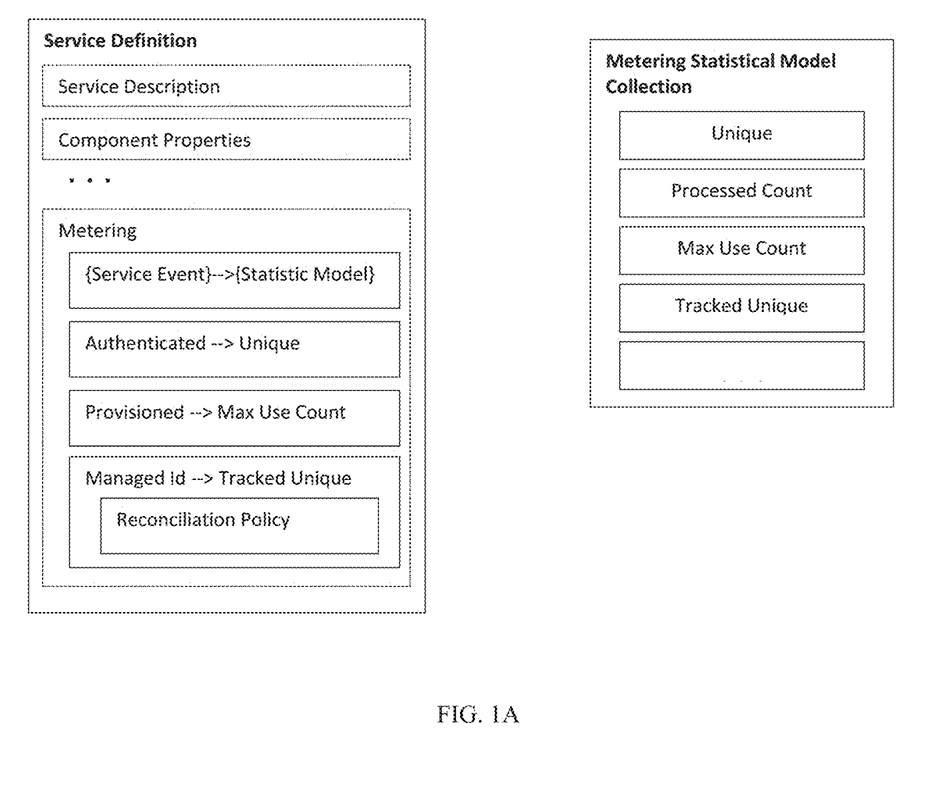
FIG. 1A is a diagram depicting an example definition of a service and a metering statistical mode collection, according an example embodiment.

FIG. 1A is a diagram depicting an example definition of a service and a metering statistical mode collection, according an example embodiment. It is noted that the definition is presented as an illustrated embodiment and that other component definitions are envisioned without departing from the embodiments discussed herein.

In an embodiment, a service definition is an eXtensible Markup Language (XML) formatted description of a service instances capabilities and properties. Service definitions also include a mapping of events generated by one or more service components to one or more of the defined metering statistical models supported. It is to be noted that when the service is operational, the components are referred to as service instances. These two terms could be considered synonymous.

The metering statistical model collection (shown in the FIG. 1A with the service definition) is a repository of machine readable modules grouped by the type of statistic that they support. Each statistic model includes a set of modules capable of real-time aggregation of events into a significant statistical sampling, grouping statistics into a batch for transmission and real-time aggregation of statistics with the statistics already present in a metering statistic data store to produce a real-time final result (that is a result until a next metering period begins or another statistic update is processed).

Figure 1B:
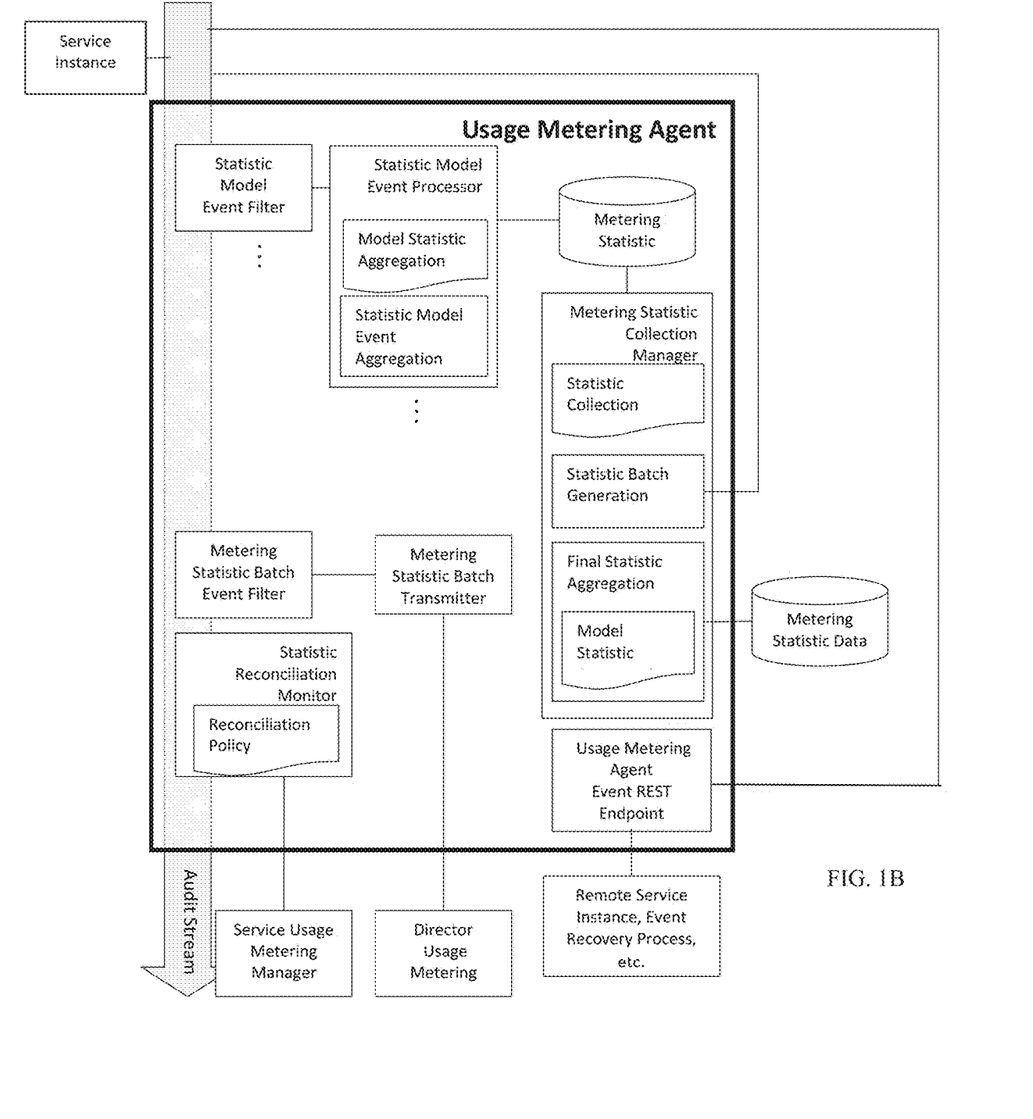
FIG. 1B is a diagram depicting components of a usage meter agent, according to an example embodiment.

FIG. 1B is a diagram depicting components of a usage meter agent, according to example embodiment. Again, the components and the interaction of the components are presented for purposes of illustration only as more or less components or different interactions can be done without departing from the embodiments presented herein.

The usage metering agent is a process where real-time statistical aggregation takes place. This is also done in a distributed fashion according to the natural system layout (i.e., not modified for metering). In a distributed environment, each service instance's node includes a usage metering agent that statistically aggregates/reduces the information received into the internal metering statistic collection. Batches of homogeneous statistics are created and forwarded to the usage metering agent on one of the director cluster nodes. The process repeats at the director cluster nodes with the metering statistic collection manager aggregating the statistics it has received into the final storage location—the metering statistic data store.

The service Instance generates an event and sends it to an audit stream. The event is filtered by each statistic model event filter, if a match is found; the event is given to the statistic model event processor, which evaluates the incoming event according to the model statistic aggregation policy with the event(s) in the metering statistic collection. If the event is determined to be statistically significant according to the model, it is placed in the collection or combined with the existing statistics in the collection according to policy.

The metering statistic collection manager monitors the metering statistic collection according to the statistic collection management policy, which dictates how/when the statistic collection is scanned for new entries as well as the processing/destination of the new entry set found. The policy supports conditions for statistic model type, metering time period, system time, collection size, event count, etc. Actions include creating/processing batches of statistics as well as metering period roll-over, and/or collection reset per metering statistic model. If statistic batch generation is selected as a policy result, the new statistics are formed into a batch, which is added to the audit stream. If final statistic aggregation is selected as the policy result, the new statistics are aggregated according to the model statistic aggregation policy into the metering statistic data store. Processed statistic records are flagged for future reference.

Both raw and statistic batch events are sent through the audit log to ensure an operational audit record is created and to provide input for the event recovery process in the event of a disaster or other unforeseen event where the metering statistic data store is compromised.

The metering statistic batch event filter looks for events created by the metering statistic collection manager. When detected the event is forwarded to the metering statistic batch transmitter, which uses a store/forward mechanism to ensure delivery of the event to the director usage metering agent.

The statistic reconciliation monitor operates according to policy as defined in the metering statistic section of the service definition. When a system state or audit event is detected that would indicate that the service instance has lost or not reported events, the service usage metering manager is notified. Conditions of this policy may include, but are not limited to a service operational event or a system condition such as Central Processing Unit (CPU) or disk utilization.

The usage metering agent event Representational State Transfer (REST) endpoint adds a web service interface to the usage metering agent. Through the web interface, remote service instances forward batches of statistics or if the service instance does not contain a usage metering agent it may send raw events to be aggregated per normal operations. Also through the web interface, the event recovery process (or similar) sends event records recovered from an audit server to be aggregated back into the system.

Figure 1C:
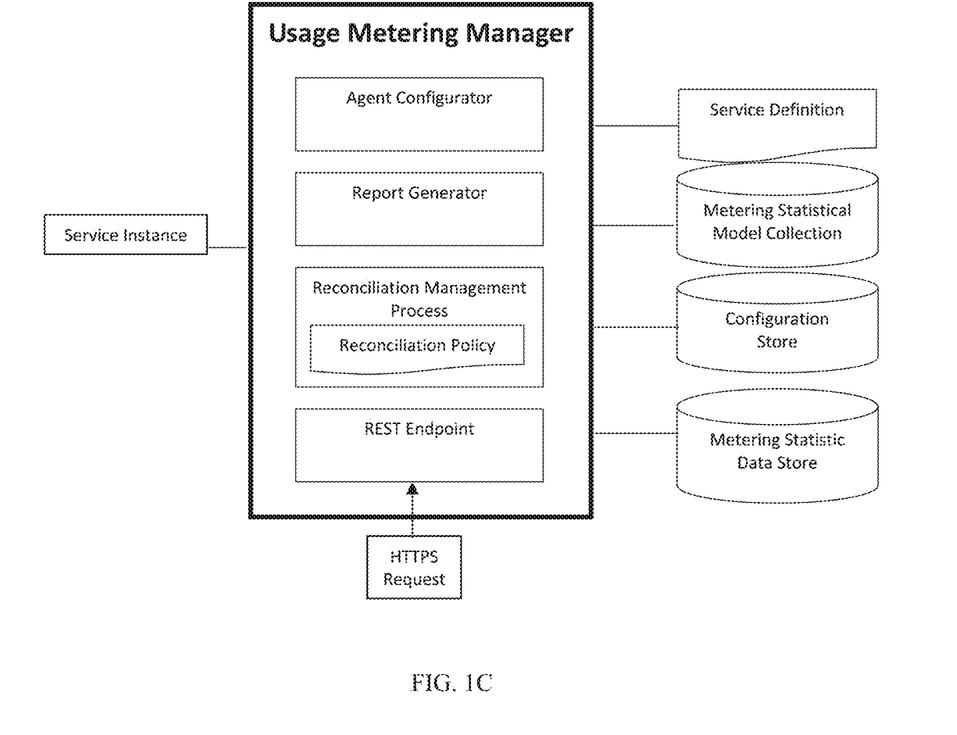
FIG. 1C. is a diagram depicting components of a usage metering manager, according to an example embodiment.

FIG. 1C. is a diagram depicting components of a usage metering manager, according to an example embodiment. Again, modifications may occur to the depiction of the components of FIG. 1C without departing from the embodiments presented herein.

The usage metering manager is responsible for metering orchestration across one or more service processes containing a multiplicity of service instances each of which may support one or more tenants. The agent configurator tracks service activities (like add/remove instance/service, etc.) and communicates with the usage metering agent on each service node for the purpose of deploying metering statistical models and providing metering period, policy and other configuration information as necessary. A report generator is included; its function is to auto generate and distribute appropriate reports at each metering period boundary and respond to requests for metering information. The reconciliation management process receives as input information from service instances and may contact one or more service instances requesting an accounting of current information according to the reconciliation policy (same as in usage metering agent). The REST endpoint provides a web service interface to the manager.

In some example embodiments (see FIGS. 1E-1G), the usage metering manager is located in the director and serves as the final statistic aggregation point for most services. This is not a limitation of the manager, but a convention of one example implementation.

Figure 1D:
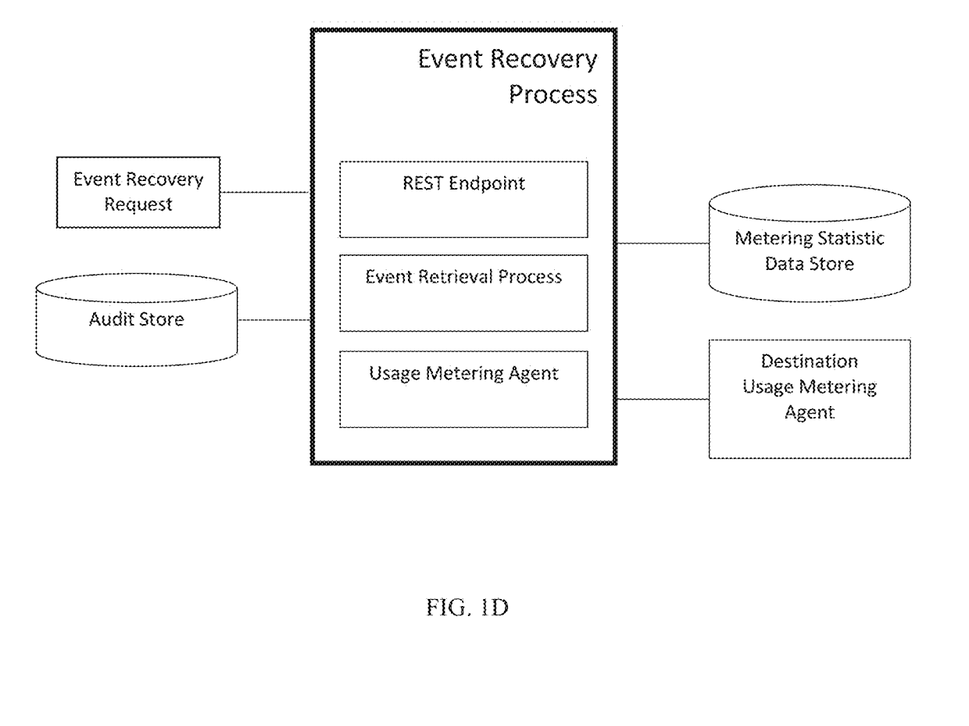
FIG. 1D is a diagram depicting components of an event recovery process, according to an example embodiment.

FIG. 1D is a diagram depicting components of an event recovery process, according to an example embodiment. Variations to the components of the event recovery process are foreseeable without departing from the embodiments presented herein.

The Event Recovery Process has the ability to pull records from the audit store and feed them back into the system. It may be contained within the Director or a Service Instance or run as a standalone VM. It receives requests via the REST Endpoint to gather and forward events. The request for event replay must include a location for the events to be forwarded to. The request must also provide the location of the audit store and information on one or more event filters such as start/end date/time, tenant, service, Metering Statistic Model, etc. to reduce the records retrieved. If the request includes one or more Metering Statistic Models, a local Usage Metering Agent is configured and records retrieved from the Audit Store are processed per normal Usage Metering Agent operations. If Metering Statistical Model information is not included, the statistics are sent individually or in bulk to the given destination.

Figure 1E:
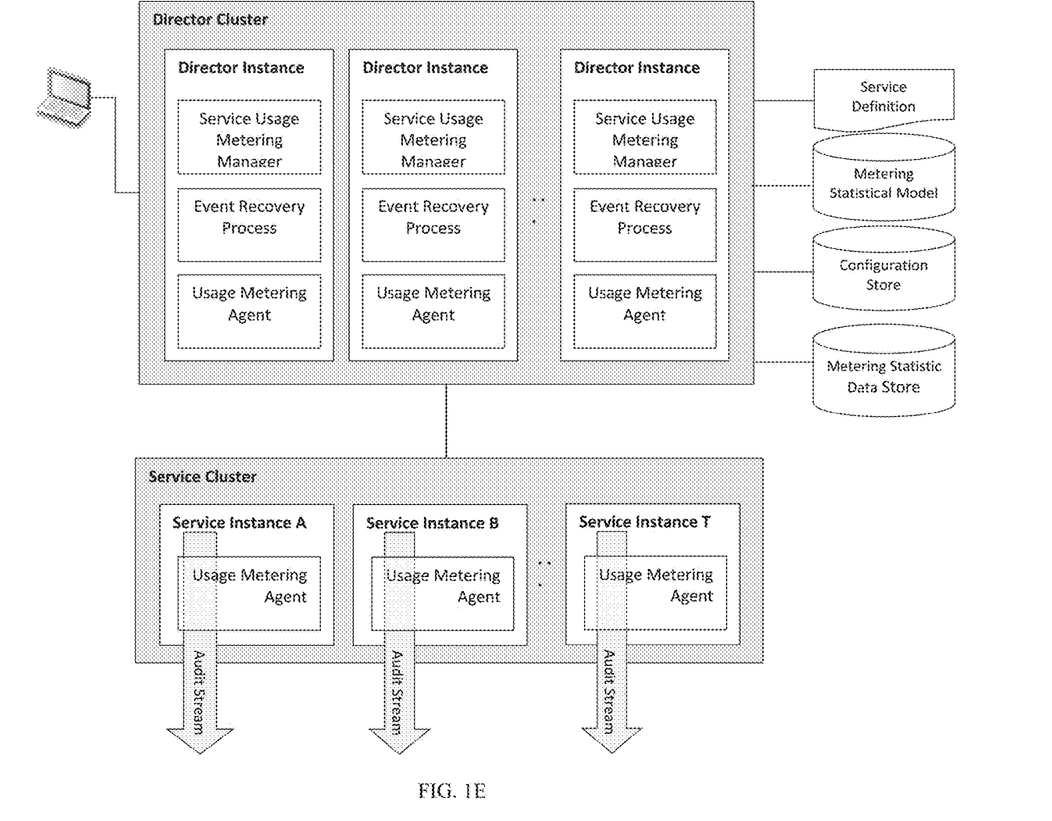
FIG. 1E is a diagram depicting an example aggregation on each service instance and each director instances, according to an example embodiment.

FIG. 1E is a diagram depicting an example aggregation on each service instance and each director instances, according to an example embodiment. This is one embodiment, it is to be noted that other embodiments are foreseeable without departing from the teachings presented herein.

In an embodiment agents are configured as service instances come online. Agents aggregate events into statistics and forward batches of statistics onto the director cluster where they are picked up by one of the director instances and processed according to normal operations with the end result being the reduced statistical information is committed to the metering statistic data store. This is a most efficient model. It provides reduction of information at each service and director instance and reduces the risk of significant data loss because information is spread across cluster members.

Figure 1F:
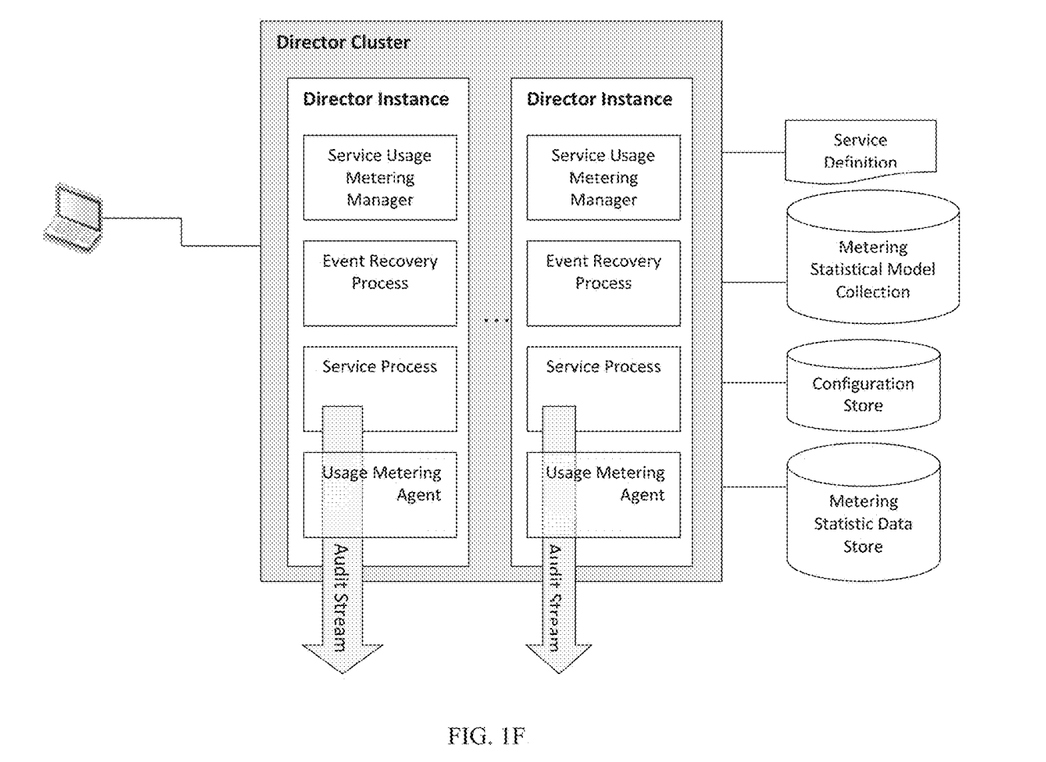
FIG. 1F is a diagram depicting an example service process with a director instance, according to an example embodiment.

FIG. 1F is a diagram depicting an example service process with a director instance, according to an example embodiment. This is one embodiment, it is to be noted that other embodiments are foreseeable without departing from the teachings presented herein.

In an embodiment, the service process may be embedded within each director instance within a cluster. In this embodiment, the usage metering agent's statistic collection management policy is configured to processes batches of statistics directly into the metering statistic data store.

In one scenario, this is a container deployment approach similar to VM container mechanisms where multiple containers can process within the same VM.

Figure 1G:
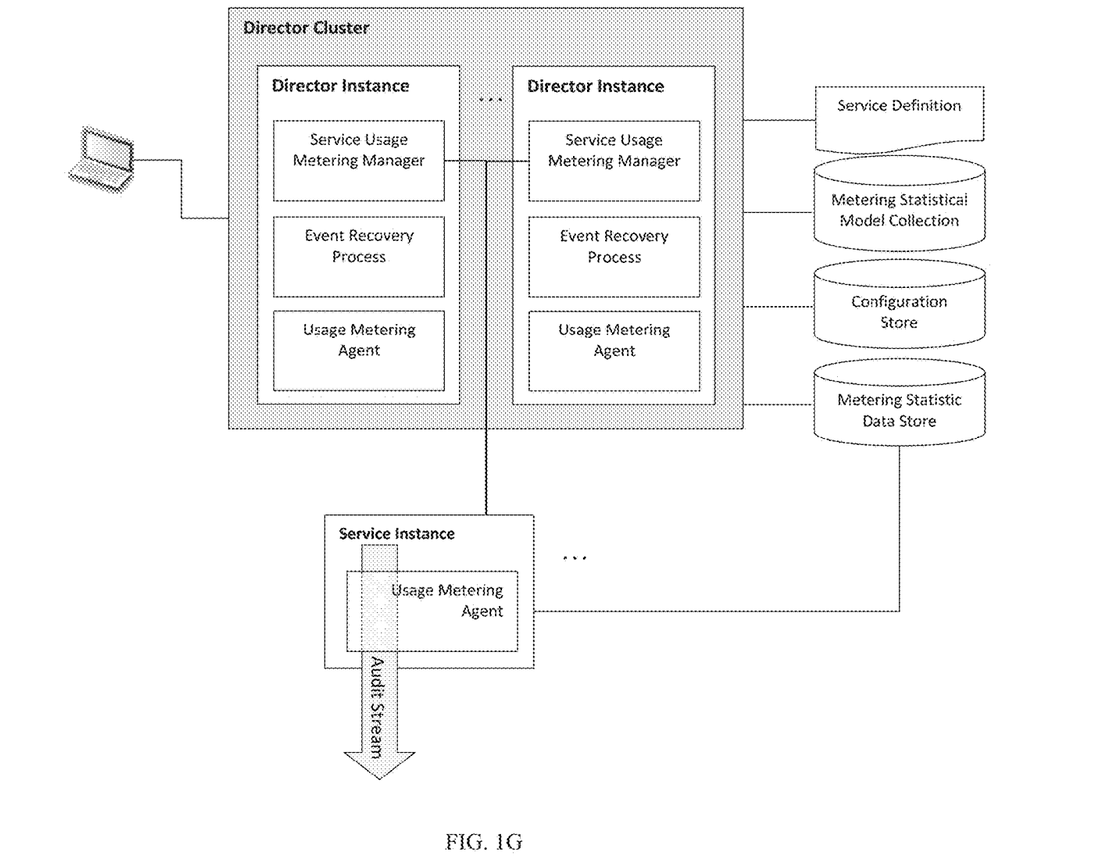
FIG. 1G is a diagram depicting an example aggregation at a service instance, according to an example embodiment.

FIG. 1G is a diagram depicting an example aggregation at a service instance, according to an example embodiment. This is one embodiment, it is to be noted that other embodiments are foreseeable without departing from the teachings presented herein.

In a sample embodiment, service instances are configured to aggregate statistics directly into the metering statistic data store.

FIG. 1H is a diagram of example metering-related configuration tables within a provider database, according to an example embodiment.

FIG. 1I is a diagram of metering-operations tables within a provider database, according to an example embodiment.

Both FIGS. 1H and 1I provide some sample data definitions for metering configuration and operations tables. It is noted that these are presented for purposes of completeness and ease of comprehension as to the data constructs discussed in various embodiments presented herein, as other additional or less constructs may be implemented without departing from the teachings presented herein.

Figure 2:
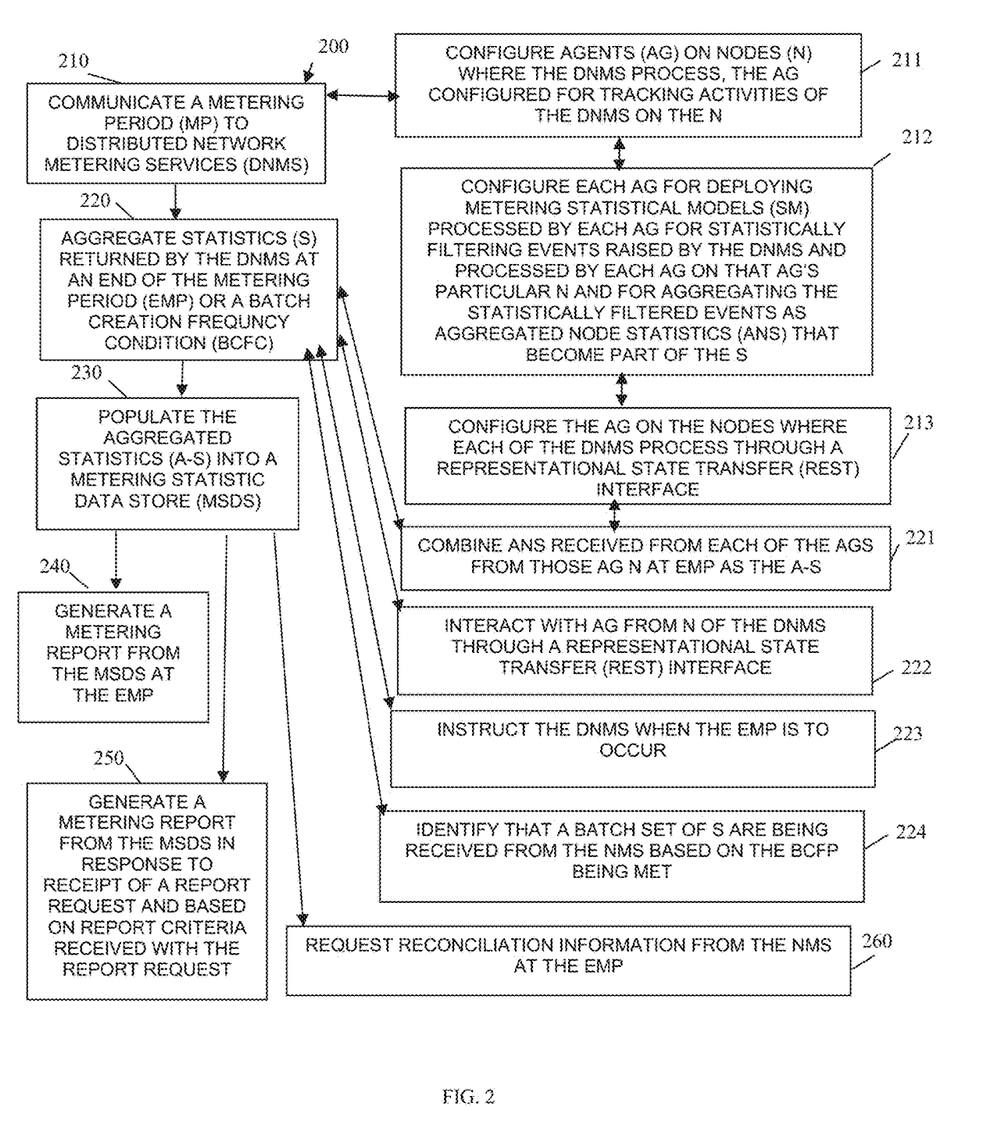
FIG. 2 is a diagram of a method for service usage metering, according to an example embodiment.
Figure 3:
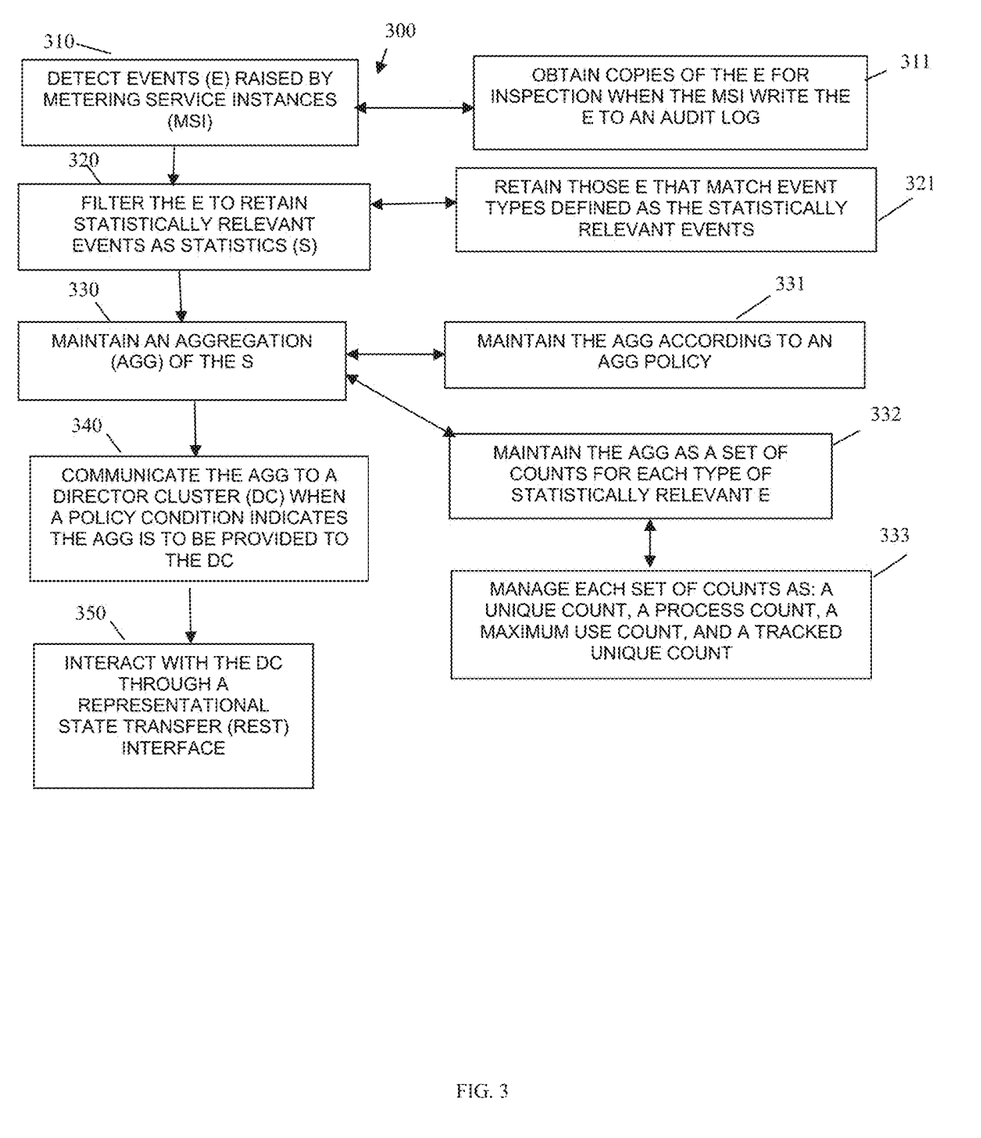
FIG. 3 is a diagram of another method for service usage metering, according to an example embodiment.
Figure 4:
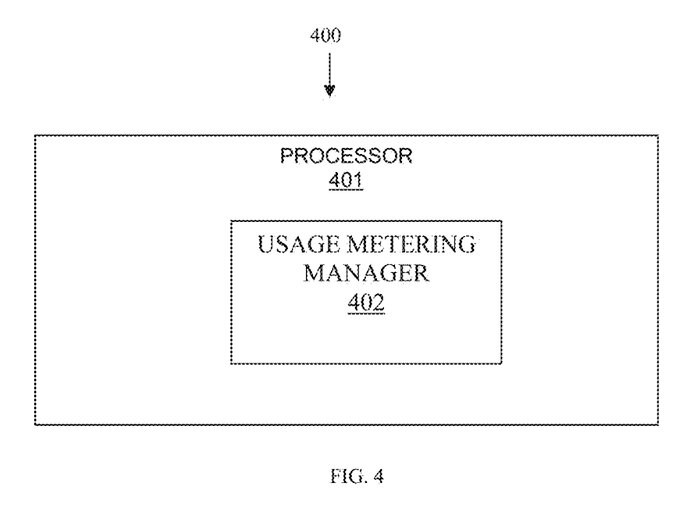
FIG. 4 is a diagram of a service usage metering system, according to an embodiment.

Aspects of the embodiments (the FIGS. 1A-1I) discussed above and other embodiments are now presented with the discussion of the FIGS. 2-4.

FIG. 2 is a diagram of a method 200 for service usage metering, according to an example embodiment. The method 200 is implemented as one or more software modules (herein after referred to as "usage metering manager"). The usage metering manager is represented as executable instructions that are implemented, programmed, and resides within memory and/or a non-transitory machine-readable storage media; the executable instructions execute on one or more hardware processors of one or more network devices and have access to one or more network connections associated with one or more networks. The networks may be wired, wireless, or a combination of wired and wireless.

In an embodiment, usage metering manager is the usage metering manager of the FIG. 1C.

In an embodiment, the usage metering manager processed within a director instance on a server having multiple other director instances, each other director instance having an instance of the usage metering manager, such as what is shown in the embodiments discussed above in the FIGS. 1E-1G.

In an embodiment, the usage metering manager processes within a cloud processing environment having one or more hardware services.

At 210, the usage metering manager communicates a metering period to distributed network metering services. The services are defined as above with respect to the FIGS. 1A-1H. The services are distributed on nodes of a distributed network and report back and interact with the usage metering manager, which is processed within a cluster on a server of a cloud (as discussed above).

According to an embodiment, at 211, the usage metering manager configures agents on each of the nodes where the distributed network metering services process. The agents are configured for tracking activities and handling administration (new services, updated services, removed services) associated with the distributed network metering services that they manage from the nodes that the agents process on. An example agent was presented in the FIG. 1B above.

According to an embodiment of 211 and at 212, the usage metering manager configured each agent for: 1) deploying metering statistical models processed by each of the agents (such as the model depicted in the FIG. 1A as the metering statistical model collection), 2) statistically filtering events raised by the distributed network metering services and processed by each of the agents on that agent's particular node, and 3) aggregating the statistically filtered events as aggregated node statistics that become part of the statistics.

According to an embodiment of 212 and at 213, the usage metering manager configures the agents on the nodes where each of the distributed network metering services process through a REST interface.

At 220, the usage metering manager's local metering agent aggregates statistics returned by the distributed network metering services in real time and at the end of the metering period or based on a batch creation frequency condition being met.

Continuing with the embodiment of 220 and 213 and in an embodiment, at 221, the usage metering manager's local metering agent combines aggregated node statistics received from each of the distributed agent's nodes in real time and at the end of the metering period as the aggregated statistics.

In an embodiment at 222, the usage metering manager interacts with an agent from a node of the distributed network metering services through a REST interface.

According to an embodiment, at 223, the usage metering manager instructs the distributed network metering services when the end of the metering period is to occur.

In an embodiment, at 224, the usage metering manager identifies that a batch set of statistics are being received from the network metering services based on the batch creation frequency condition being met.

At 230, the usage metering manager's local metering agent populates the aggregated statistics into a metering statistic data store for automated use/processing in a number of manners.

For example, at 240, the usage metering manager generates a metering report from the metering statistic data store at the end of the metering period.

In another case, at 250, the usage metering manager generates a metering report from the metering statistic data store in response to receipt of a report request and based on report criteria received with the report request.

In yet another situation, at 260, the usage metering manager request reconciliation information from the network metering services at the end of the metering period. The may also be driven by policy, which can include a change in health status of the service instance and/or requested by an administrator.

In still another situation, the usage metering manager sends alerts to service providers in response to the aggregated statistics for use by the service providers in updating subscription and/or pricing relevant to the services being tracked and metered through the usage metering manager and the network metering services.

FIG. 3 is a diagram of another method 300 for service usage metering, according to an example embodiment. The method 300 is implemented as one or more software module(s) (herein after referred to as "usage metering agent") on one or more hardware devices. The usage metering agent is represented as executable instructions that are implemented, programmed, and resides within memory and/or a non-transitory machine-readable storage medium; the executable instructions execute on one or more hardware processors of the one or more hardware devices and have access to one or more network connections associated with one or more networks. The networks may be wired, wireless, or a combination of wired and wireless.

In an embodiment, the usage metering agent is the usage metering agent of the FIG. 1B.

In an embodiment, the processing of the usage metering agent is processed on a hardware node of a network by one or more processors of that node.

The usage metering agent collects aggregated node statistics for service instances on the node in which the usage metering agent processes, and the usage metering agent reports the aggregated node statistics to the usage metering manager, such as the usage metering manager described in the FIGS. 1C and 2 above.

At 310, the usage metering agent detects events raised by metering services instances processing on a node that is tracking a service for metering information.

According to an embodiment, at 311, the usage metering agent obtains copies of the events for inspection when the metering service instances write the events to an audit log on the node.

At 320, the usage metering agent filters the events to retain statistically relevant events as statistics.

In an embodiment, at 321, the usage metering agent retains those events that match event types defined as the statistically relevant events.

At 330, the usage metering agent maintains an aggregation of the statistics.

In an embodiment, at 331, the usage metering agent maintains the aggregation of the statistics according to conditions defined in an aggregation policy. This policy can also include a frequency for reporting statistical batches as a percentage of the metering period duration or other temporal criteria.

According to an embodiment, at 332, the usage metering agent maintains the aggregation of the statistics as a set of counts for each type of statistically relevant events.

In an embodiment of 332 and at 333, manage each set of counts as: a unique count, a process count, a maximum use count and a tracked unique count. The unique count represents the number of unique identities initiating an event, which may represent a request for or access to a set of services; the set of services includes individual services based on use of a unique variant tag for each service. The maximum use count representing the high watermark for instances of a particular service or workload within a given metering period. The tracked count is used for calculating the number of items that exist over multiple metering periods; for example, an item may come into existence in period 1 and be removed from existence in period 5 but needs to be reported in periods 1-5 for metering purposes. The process count represents a sum of all events of a particular type and may be used to count things, such as the number of users provisioned or de-provisioned within a given metering period. It is to be noted that other statistical counts may be configured and employed, without departing from the beneficial teachings presented herein.

It is noted that the types of information aggregated and counted by the usage metering agent can be configured and customized. Thus, others are possible without departing from the teachings presented herein.

At 340, the usage metering agent communicates the aggregation of the statistics to a director cluster's usage metering manager's local metering agent, such as what was shown in the FIGS. 1C and 2 above. The aggregation of the statistics is communicated when a policy condition indicates the aggregation is to be provided to the director cluster's usage metering manager.

In an embodiment of 340 and at 350, the usage metering agent interacts with the directory cluster through a REST interface.

FIG. 4 is a diagram of a service usage metering system 400, according to an embodiment. Various components of the statistical event service usage metering system 400 are software module(s) represented as executable instructions, which are programed and/or reside within memory and/or non-transitory computer-readable storage media for execution by one or more hardware devices. The components and the hardware devices have access to one or more network connections over one or more networks, which are wired, wireless, or a combination of wired and wireless.

In an embodiment, the statistical event service usage metering system 400 implements, inter alia, the processing depicted in the FIGS. 1A-1H and the processing depicted in the FIGS. 2-3. Accordingly, embodiments discussed above with respect to the FIGS. presented herein and above are incorporated by reference herein with the discussion of the statistical event service usage metering system 400.

The statistical event service usage metering system 400 includes a processor 401 and a usage metering manager 402.

The service usage metering manager 402 is configured and adapted to: execute on the processor 401, configure agents (to: filter events as statistics, selectively aggregate the statistics, and report the aggregated statistics back to the usage metering manager 402), and provide an interface for interaction between the usage metering manager 402 and the agents.

In an embodiment, the service usage metering manager 402 is further configured to define: i) an end of metric reporting period for the agents to report their individual aggregated statistics back to the service usage metering manager 402 and ii) intermediate batch reporting frequencies for distributed agents to report statistical batches to the usage metering manager's local metering agent.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The invention claimed is:

1. A method, comprising:
communicating, by a usage metering manager executing on a hardware processor, a batch creation frequency condition to distributed network metering services;
detecting, by the usage metering manager, the batch creation frequency condition that indicates batch sets of statistics and raw statistics from which the batch sets of statistics are derived are received from the distributed network metering services, wherein detecting further includes maintaining the raw statistics as an operational audit record for recovery processing when a metering statistic data store becomes compromised;
aggregating, by the usage metering manager, the batch sets of statistics returned by the distributed network metering service responsive to the detecting of the batch creation frequency condition as aggregated statistics;
populating, by the usage metering manager the aggregated statistics into the metering statistic data store;
sending an alert for processing by a service based on the aggregated statistics; and
performing a recovery process using the raw statistics as the operational audit record when the metering statistic data store fails or is compromised.

2. The method of claim 1, wherein communicating further includes, configuring agents on nodes where the distributed network metering services process, the agents configured for tracking activities of the distributed network metering services on the nodes.

3. The method of claim 2, wherein configuring further includes, configuring each agent for deploying metering statistical models processed by each agent for statistically filtering events raised by the distributed network metering services and processed by each agent on that agent's particular node and for aggregating the statistically filtered events as aggregated node statistics that become part of the aggregated statistics.

4. The method of claim 3, wherein communicating further includes configuring the agents on the nodes where each of the distributed network metering services process through a Representational State Transfer (REST) interface.

5. The method of claim 4, wherein aggregating further includes combining aggregated node statistics received from each of the agents from those agent nodes in real time and when the batch creation frequency condition is met as the aggregated statistics.

6. The method of claim 1, wherein aggregating further includes interacting with agents from nodes of the distributed network metering services through a Representational State Transfer (REST) interface.

7. The method of claim 1, wherein aggregating further includes instructing the network metering services when the batch creation frequency condition is met.

8. The method of claim 1 further comprising, generating a metering report from the metering statistic data store when batch creation frequency condition is met.

9. The method of claim 1 further comprising, generating a metering report from the metering statistic data store in response to receipt of a report request and based on report criteria received with the report request.

10. The method of claim 1 further comprising, requesting reconciliation information from the network metering services based on one of: an end of a metering period, a trigger relevant to a health status change in a particular service instance, and a request issued from an administrator.

11. A method, comprising:
detecting, by a usage metering agent executing on a hardware processor, events raised by metering service instances;
filtering the events to retain statistically relevant events as statistics;
maintaining an aggregation of the statistics when an aggregation policy condition is met that indicates batch sets of the statistics and raw statistics from which the batch sets of the statistics are derived have been received from the metering service instances, wherein maintaining further includes maintaining the raw statistics as an operational audit record for recovery processing when a metering statistic data store becomes compromised;

communicating the aggregation to a director cluster when an aggregation policy condition indicates the aggregation is to be provided to the director cluster;

providing an alert for processing by a service based on the aggregation; and performing a recovery process using the raw statistics as the operational audit record when the metering statistic data store fails or is compromised.

12. The method of claim 11, wherein detecting further includes obtaining copies of the events for inspection when the metering service instances write the events to an audit log.

13. The method of claim 11, wherein filtering further includes retaining those events that match event types defined as the statistically relevant events.

14. The method of claim 11, wherein maintaining further includes maintaining the aggregation according to the aggregation policy condition.

15. The method of claim 11, wherein maintaining further includes maintaining the aggregating as a set of counts for each type of statistically relevant event.

16. The method of claim 12, wherein maintaining further includes managing each set of counts as:

a unique count, a process count, a maximum use count, and a tracked unique count.

17. The method of claim 11, wherein communicating further includes interacting with the directory cluster through a Representational State Transfer (REST) interface.

18. A system, comprising:

a processor;

a usage metering manager configured and adapted to: i) execute on the processor, ii) configure agents to: filter events as statistics, selectively aggregate the statistics based on an aggregation policy conditions, and report the aggregated statistics back to the usage metering manager in batches when a batching frequency condition is met indicating that batch sets of the statistics and raw statistics from which the batch sets of statistics were derived have been received, and maintain the raw statistics as an operation audit record for recovery processing when a metering statistic data store becomes compromised iii) provide an interface for interaction between the usage metering manager and the agents, iv) send an alert to a service for processing based on the aggregated statistics; and v) perform a recovery process using the raw statistics as the operational audit record when the metering statistic data store fails or is compromised.

19. The system of claim 18, wherein usage metering manager is further configured and adapted, to define: intermediate batch reporting frequencies for distributed agents to report statistical batches to a local metering agent of the usage metering manager.

* * * * *